(12) United States Patent
Sharkey

(10) Patent No.: US 6,773,589 B2
(45) Date of Patent: Aug. 10, 2004

(54) METHOD AND APPARATUS FOR REMOVING PARTICULATE CONTAMINANTS FROM COMMERCIAL LAUNDRY WASTE WATER

(76) Inventor: James P. Sharkey, P.O. Box 304, Calverton, NY (US) 11933

( * ) Notice: Subject to any disclaimer, the term of this patent is extended or adjusted under 35 U.S.C. 154(b) by 0 days.

(21) Appl. No.: 10/114,566

(22) Filed: Apr. 1, 2002

(65) Prior Publication Data

US 2002/0139758 A1 Oct. 3, 2002

Related U.S. Application Data

(63) Continuation-in-part of application No. 10/009,000, filed on Dec. 7, 2001, now Pat. No. 6,692,638, which is a continuation-in-part of application No. 09/400,418, filed on Sep. 21, 1999, now abandoned.

(51) Int. Cl.[7] .............................................. B01D 41/02

(52) U.S. Cl. ...................... 210/269; 210/274; 210/275; 210/279; 210/290; 210/293

(58) Field of Search ......................... 210/269, 274–275, 210/279, 290, 293, 792, 793, 794, 797–798

(56) References Cited

U.S. PATENT DOCUMENTS

| | | | |
|---|---|---|---|
| 648,105 A | * | 4/1900 | Greer .......................... 210/264 |
| 1,326,374 A | * | 12/1919 | Rossiter ...................... 210/317 |
| 1,997,830 A | | 4/1935 | Michaud |
| 2,087,442 A | | 7/1937 | Nack |
| 3,554,377 A | | 1/1971 | Miller |
| 5,456,831 A | | 10/1995 | Sullivan |
| 5,908,558 A | | 6/1999 | Holland |
| 6,692,638 B2 | * | 2/2004 | Sharkey ...................... 210/220 |
| 2002/0139758 A1 | * | 10/2002 | Sharkey ...................... 210/767 |

\* cited by examiner

Primary Examiner—Robert James Popovics
(74) Attorney, Agent, or Firm—Galgano & Burke, LLP

(57) ABSTRACT

A filtration apparatus includes a tank having an upper chamber and a lower baffle, layers of stone and carbon between the upper chamber and the lower baffle, a water inlet to the upper chamber, and a water outlet below the lower baffle. The upper chamber is divided by a vertical baffle which separates the water inlet from a backwash outlet. A backwash inlet is provided below the lower baffle. An air manifold coupled to an air pump is placed between the lower baffle and the upper chamber. During backwash, air is mixed with water to cause a turbulent flow. The baffle in the upper chamber prevents filter media from exiting the apparatus during backwash.

8 Claims, 4 Drawing Sheets

METHOD AND APPARATUS FOR REMOVING PARTICULATE CONTAMINANTS FROM COMMERCIAL LAUNDRY WASTE WATER

This application is a continuation-in-part of application Ser. No. 10/009,000 filed Dec. 7, 2001 now U.S. Pat. No. 6,692,638 entitled "Method and Apparatus for Removing Particulate Contaminants from Commercial Laundry Waste Water", which, in turn, is a continuation-in-part of similarly titled application Ser. No. 09/400,418 filed Sep. 21, 1999 (now abandoned), the complete disclosures of which are hereby incorporated by reference herein.

BACKGROUND OF THE INVENTION

1. Field of the Invention

The present invention relates generally to a filtration apparatus for separating solid particles from a liquid. More particularly, the invention relates to filtration apparatus for removing particulate contaminants from commercial laundry waste water and to methods for accomplishing the same.

2. State of the Art

State and local governments across the country as well as the federal government have enacted new laws or expanded existing laws to reverse or limit the threat of environmental pollution. These environmental laws are typically directed toward commercial enterprises which create various wastes streams as a by-product of manufacturing products or providing services. The commercial laundry industry and particularly commercial laundromats are specifically affected by environmental laws which limit the amount of suspended solids or particulate contaminants in commercial laundry waste water which can be discharged into the environment. Particulate contaminants in commercial laundry waste water generally consist of lint, hair, dirt and soap scum. To meet the requirements of current environmental laws, the amount of particulate contaminants in commercial laundry waste water must be reduced to an acceptable level before it is discharged into the ground water and/or municipal sewage system.

Co-owned U.S. Pat. No. 5,350,526 discloses a filtration apparatus specifically intended for removing particulate contaminants from commercial laundry waste water. It has at least one porous mesh-like filter bag coupled between an inlet manifold for receiving waste water containing particulate contaminants and an outlet manifold for discharging the particulate contaminants separated from the waste water. The filter bag is agitated by a paddle, so as to prevent the mesh-like material of the filter bag from being clogged. The apparatus is capable of trapping particles as small as 5 microns depending on the filter bag mesh. Those skilled in the art will appreciate that the finer the mesh the more slowly the water will be filtered. One of the challenges in designing a filter for commercial laundry waste water is to be able to accommodate a flow rate of about 12,500 gallons per day.

Co-owned U.S. Pat. No. 5,575,913 discloses a filtration apparatus having a housing, a filter element, an inlet, a first discharge outlet and a second discharge outlet. The housing includes a bottom and an upwardly extending surrounding wall. The filter element is disposed in the housing and spans the surrounding wall with the filter element spaced above the bottom of the housing to define an upper chamber and a lower chamber, and the filter element being angled, preferably 45 degrees from the horizontal, so that one end of the filter element is lower relative to the other end. The inlet is in fluid communication with the upper chamber for receiving waste water containing particulate contaminants. A first discharge outlet is in fluid communication with the lower chamber for discharging filtered waste water. The second discharge outlet is in fluid communication with the upper chamber adjacent the lower end of the filter element for discharging filtered particulate contaminants. The apparatus is capable of trapping particles about 50 microns in diameter (or smaller, i.e. 5–10 microns).

The previously incorporated parent application discloses a filtration apparatus which includes a rectangular tank having an upper baffle and a lower baffle, layers of stone and carbon between the baffles, a water inlet above the upper baffle, and a water outlet below the lower baffle. The tank is approximately 30"×36"×60"; the layer of stone is approximately 4" deep and consists of ¾" lying on the lower baffle over which is optionally placed a 2" deep layer of ½" stone; the layer of carbon is approximately 18"–24" deep lying on top of the stone layer; the upper baffle is approximately 10" above the top of the carbon layer; the water inlet is located approximately 15" above the upper baffle, the water outlet includes two outlets approximately 2" below the lower baffle; and an air vent is provided 1" above the water inlet. In operation, waste water enters through the inlet, is spread over the upper baffle and is distributed through the upper baffle onto the carbon at the rate of approximately 5–10 gallons per minute. The carbon layer traps particles which are approximately 10 microns in diameter, and cleaner water exits through the two outlets. The filtration apparatus is preferably used in conjunction with other apparatus including additional filters, holding tanks, a backwash pump and air blower, and a leaching pool system.

The filtration apparatus preferably includes a laundry waste sump, a primary 50 micron static screen filter, an array of 100 micron filter socks, a 9,000 gallon holding tank, a pair of 100 gallon surge tanks, a pair of parallel secondary carbon filters according to the invention, a 5 micron polishing filter, a backwash pump, an air blower, a 6,000 gallon sludge holding tank, one clear well, and a system of four leaching pools. Waste water enters the sump by gravity flow and is pumped from the sump to the primary 50 micron static screen filter which is substantially the same as the filter disclosed in co-owned U.S. Pat. No. 5,575,913. Solids removed by the primary filter are discharged by gravity to the array of 100 micron filter socks where they are dewatered with the water therefrom being returned to the sump. The primary effluent from the primary filter is delivered by gravity to the 9,000 gallon holding (equalization tank). Water from the equalization tank is pumped to the first 100 gallon surge tank from which it flows by gravity to the pair of secondary carbon filters. The effluent from the carbon filters is delivered by gravity to the second 100 gallon surge tank from which it is pumped through the 5 micron polishing filter into the clear well and from there to the four leaching pools. Water from the clear well pool is used to backwash the carbon filters using the backwash pump and the air blower which aerates the backwash water. During backwash, backwash water exiting the carbon filters is directed to the 6,000 gallon sludge holding tank. The carbon filters are operated for 14 to 23 hours continuously and backwashed for ten minutes every day. Each carbon filter operates at a flow rate of approximately 9,000 gallons per day and is backwashed with 450 gallons of water.

A problem which is common to all water filters is that during backwash some solid contaminants remain embedded in the filter media. Over time this lessens the efficiency of the filter, demands more frequent backwashing, and uses more energy to operate the filter. Efforts to increase the efficacy of backwashing usually result in lost filter media. Filter media together with solid contaminants are removed from the filter during backwash. Over time this can be costly as it requires the repeated replacement of filter media.

SUMMARY OF THE INVENTION

It is an object of the invention to provide an improved filtration apparatus and method for separating and removing particulate contaminants from a relatively large continuous flow of laundry waste water for discharge of the filtered waste water into the environment, i.e., ground water and/or municipal sewage system.

It is another object of the invention to provide such a filtration apparatus having a filter element for separating particulate contaminants from laundry waste water in which the separated particulate contaminants can be easily and quickly manually or automatically removed from the apparatus without injuring or removing the filter element.

It is still yet another object of the present invention to provide such a filtration apparatus that is easily and inexpensively manufactured, highly efficient in operation, and which requires little lifetime maintenance.

It is yet another object of the invention to improve the backwashing efficiency of such a filtration apparatus.

In accord with these objects which will be discussed in detail below, the filtration apparatus of the present invention includes a rectangular tank having an upper chamber and a lower baffle, layers of stone and carbon between the chamber and the baffle, a water inlet to the upper chamber, and a water outlet below the lower baffle. According to a presently preferred embodiment, the tank is approximately 30"×36"× 60"; the layer of stone is approximately 4" deep and consists of approximately ¾" stone lying on the lower baffle over which is optionally placed an approximately 2" deep layer of ½" stone; the layer of carbon is approximately 18"–24" deep lying on top of the stone layer; the water inlet is located approximately 25" above the layer of carbon, the water outlet includes two outlets approximately 2" below the lower baffle; and an air vent is provided approximately 1" above the water inlet.

According to the invention, the upper chamber is divided into two parts, one part adjacent to the water inlet and the other part provided with backwash outlets. An air manifold is placed between the carbon layer and the lower baffle, preferably about 2" under the top surface of the stone. The air manifold is coupled to an air pump for use during backwash. Backwash water inlets are located below the lower baffle.

In operation, waste water enters through the inlet and flows into the upper chamber onto the carbon at the rate of approximately 5–10 gallons per minute. The carbon layer traps particles which are approximately 5 to 10 microns in diameter, and cleaner water exits through the two outlets. During backwash, water is pumped up through the lower baffle, through the stone layer and through the carbon layer into the upper chamber. Air from the air manifold mixes with the water and causes a turbulent action which helps remove solid contaminants from the carbon media. Vertical and angled baffles separating the two parts of the upper chamber allow water and contaminants to exit through the backwash outlets but prevent filter media from exiting.

According to the presently preferred methods of the invention, the carbon filters are operated for 14 to 23 hours continuously and backwashed for ten minutes every day. Each carbon filter operates at a flow rate of approximately 9,000 gallons per day and is backwashed with 450 gallons of water. The air pump coupled to the air manifold preferably delivers approximately 130 cfm of air to the manifold.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 3:
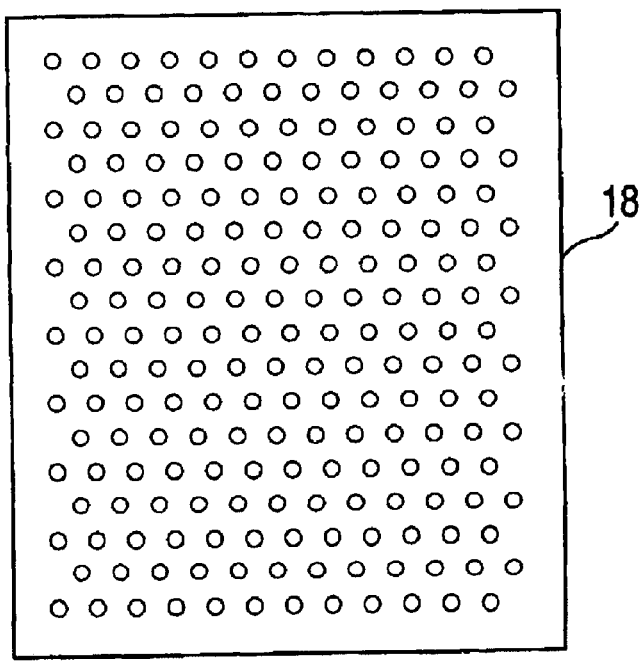
FIG. 3 is a plan view of the lower baffle.
Figure 4:
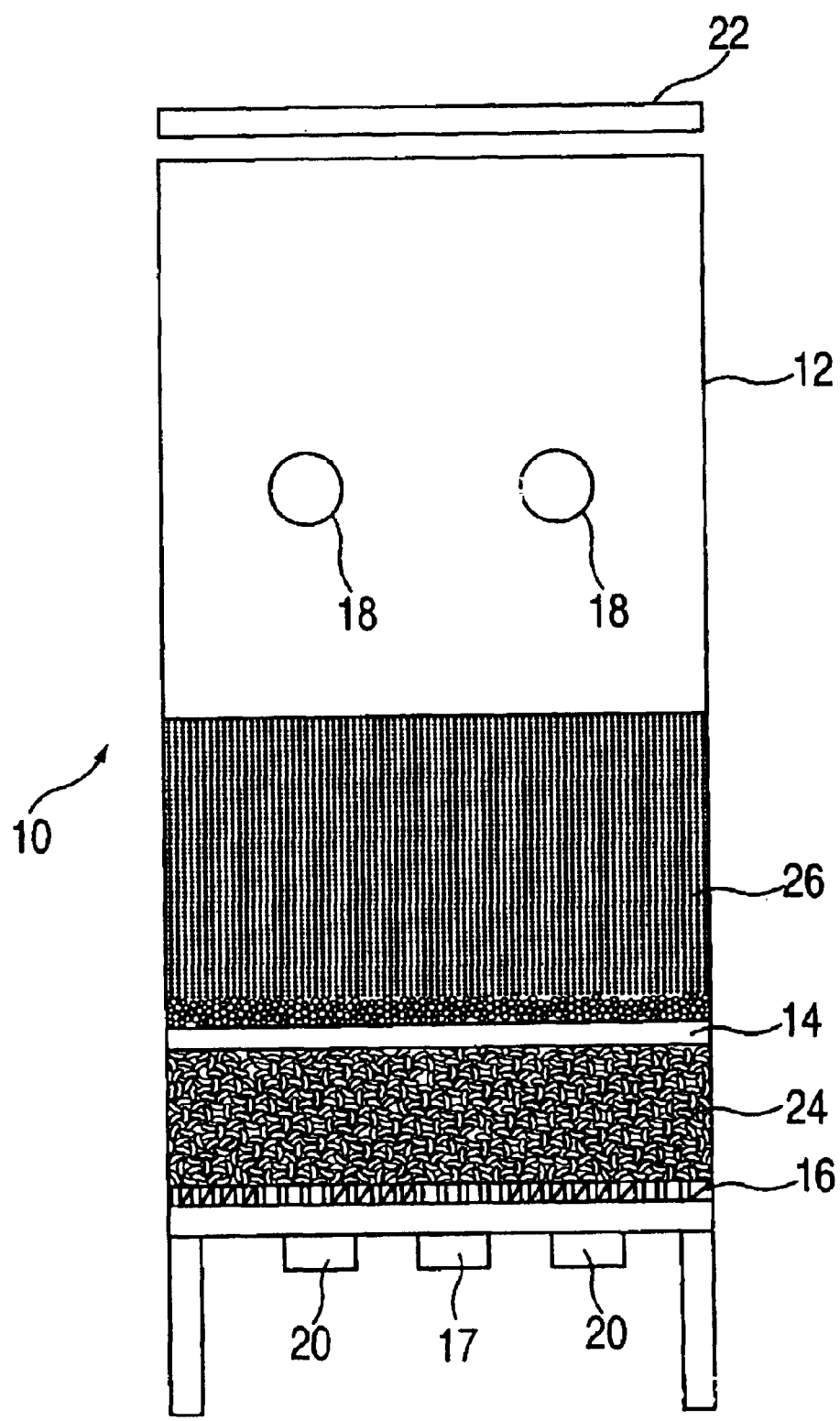
FIG. 4 is a view similar to FIG. 1 illustrating the backwash outlets.

Referring now to FIGS. 1–4, a filtration apparatus 10 according to the present invention includes a rectangular tank 12 having an upper chamber A–B and a lower baffle 16, a pair of backwash water inlets 17, a pair of backwash water outlets 18, a waste water inlet 19, two filtered water outlets 20, an air vent 21, and a removable cover 22. According to the invention, a layer of stone 24 is placed on top of the lower baffle 16 and a layer of granular carbon 26 is placed on top of the layer of stone. According to an alternate of said embodiment, sand, zeolite or other types of granular filter media may be used in lieu of carbon. As shown in FIG. 3, the lower baffle 16 is a plate having a plurality of holes drilled in it. The purpose of the lower baffle 16 is to support the layer of stone 24 whose purpose is to support the layer of carbon 26. In addition, the lower baffle serves to uniformly distribute the backwash water as described in greater detail hereinafter.

Figure 1:
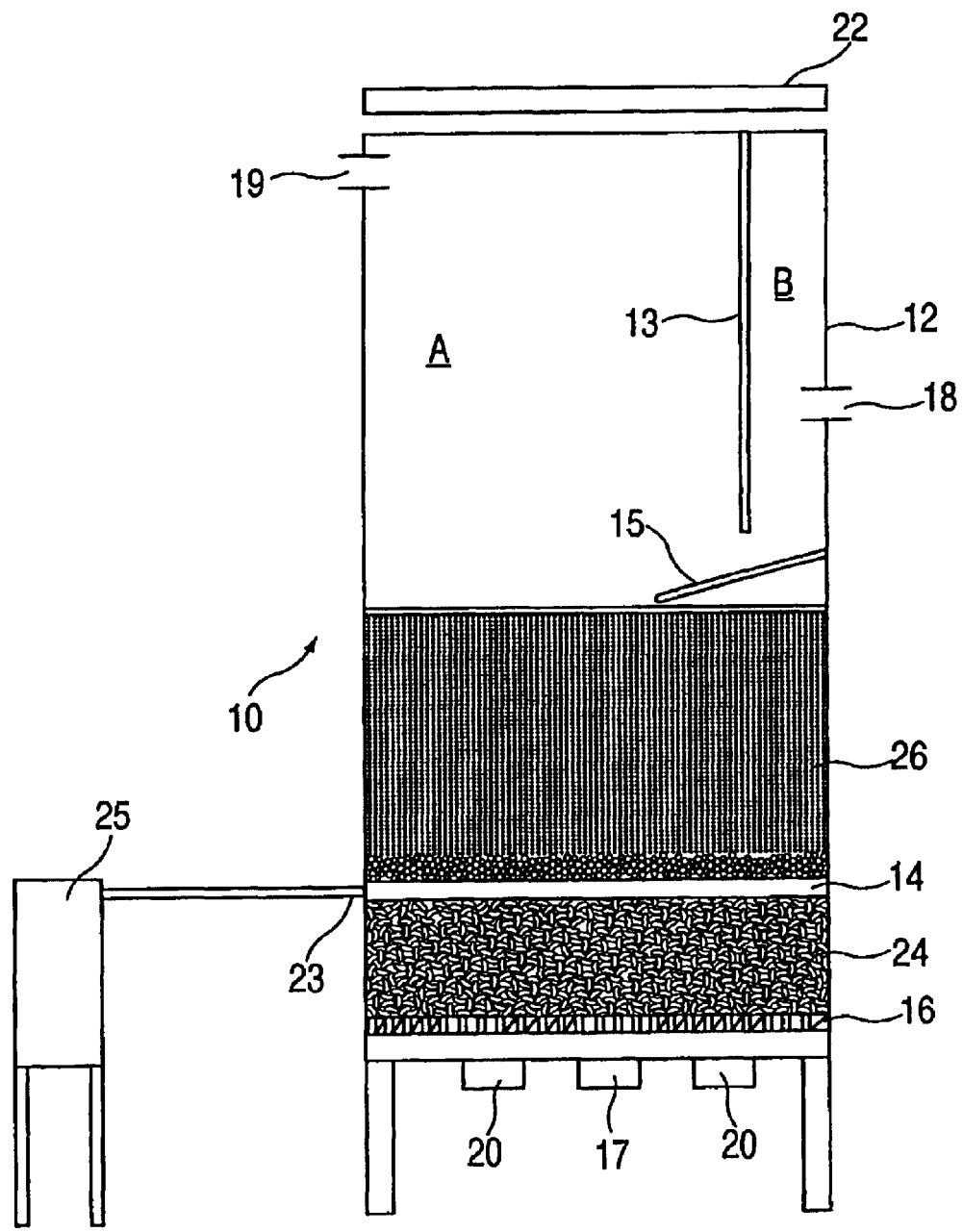
FIG. 1 is a schematic, partially sectional, view of the filtration apparatus according to the invention.
Figure 2:
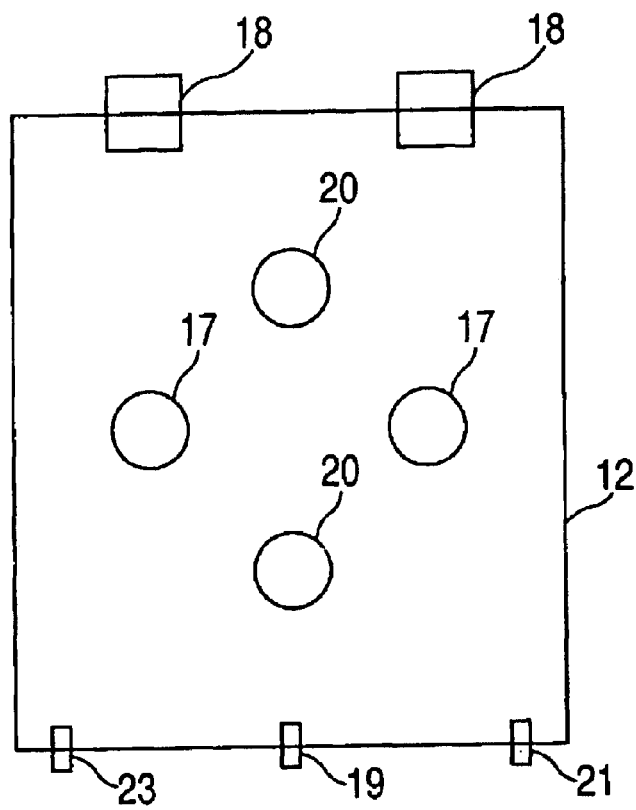
FIG. 2 is a schematic top view of the filter of FIG. 1 with the cover, baffles, and filter media removed.

As seen best in FIG. 1, the upper chamber is divided into two parts A and B by a vertical baffle 13 and an angled baffle 15 is disposed below the baffle 13. In addition, an air manifold 14 is placed between the lower baffle 16 and the carbon 26. It is preferably placed approximately two inches below the top surface of the stone 24. The air manifold 14 is coupled to an air pump 25 via an air inlet 23.

According to a presently preferred embodiment, the tank 12 is approximately 30"(w)×36"(d)×60"(h) and made of polyethylene. The baffle 16 is preferably provided with ½" holes. The layer of stone 24 is preferably approximately 4" deep and consists of ¾" stone lying on the lower baffle 16 and optionally 2" deep of ½" stone overlying the ¾" stone. The layer of carbon particles 26 is approximately 18" to 24" deep, consisting of approximately 330 to 440 pounds of 8×30 granular carbon. The vertical baffle 13 preferably extends approximately 30" down from the top of the tank. The angled baffle 15 is preferably approximately 10" long and is disposed at an angle of approximately 45 degrees. The pair of water outlets 18 are preferably located approximately 40" above the lower baffle 16 (17" above the angled baffle 15). The two outlets 20 and two inlets 17 are preferably located approximately 2" below the lower baffle 16. As seen best in FIG. 2, a 2" air vent 21 is provided for odor removal preferably near the top of the tank 12 from where it would be typically vented to the atmosphere (not shown).

Figure 5:
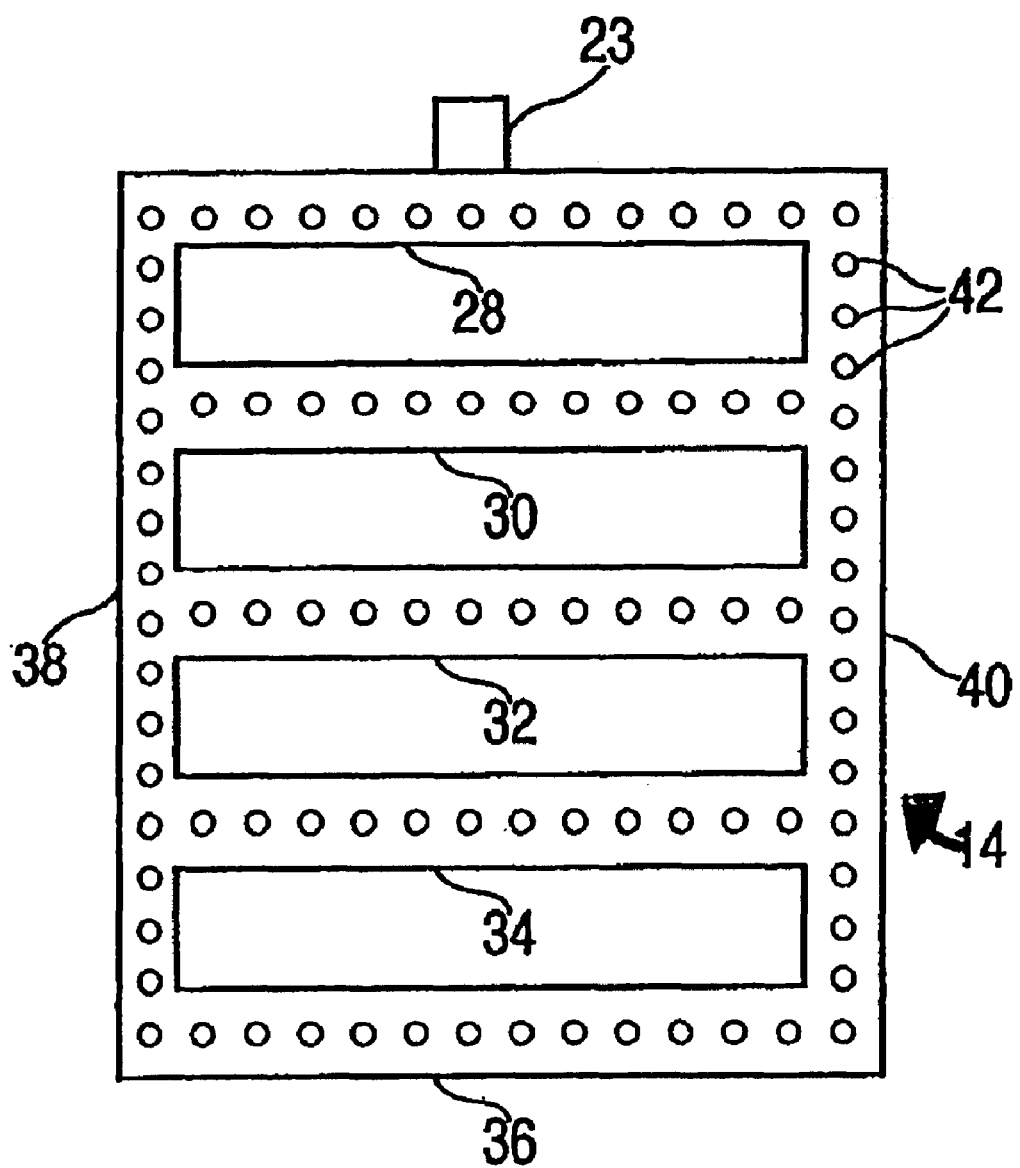
FIG. 5 is a schematic plan view of the air manifold.

Referring now to FIG. 5, the air manifold 14 preferably includes a gridwork of pipes, e.g. 28, 30, 32, 34, 36, 38, 40, each of which is provided with a plurality of air outlet holes, e.g. 42. According to the presently preferred embodiment, the pipes are approximately 1" in diameter and the holes are approximately ⅛" in diameter. The presently preferred air manifold has approximately 70 air outlet holes.

In operation, waste water enters through the inlet 19, into the upper chamber part A onto the carbon 26 at the rate of approximately 1 to 10 and, preferably, 5–10 gallons per minute. The carbon layer 26 traps particles which are approximately 5 to 10 microns in diameter, and cleaner water exits through the two outlets 20. The filtration apparatus is preferably used in conjunction with other apparatus including additional filters, holding tanks, a backwash pump and air pump or blower, and a leaching pool system as described in the previously incorporated parent application.

According to the presently preferred methods of the invention, the filtration apparatus is operated for 14 to 23 hours continuously and backwashed for ten minutes every day. The filter operates at a flow rate of approximately 9,000 gallons per day and is backwashed with 450 gallons of water.

During backwash, water is pumped into the backwash inlets 17 through the stone 24 where it is mixed with air from the air manifold 14. A turbulent mixture of air and water enters the carbon 26 which separates contaminants from the carbon. More particularly, water previously cleaned by the filter 10, (water from a clear well not shown) is used to backwash the filters. Water enters through inlets 17 and flows upward to exit outlets 18. At the same time the air pump 25 is activated, sending over 130 cfm of air into the air manifold 14. The air manifold 14 injects air evenly throughout the filter bed; along with the backwash water scrubs the filter media to separate the dirt from the filter media. Inside the upper chamber part A the water, air, and filter media create a turbulent action to separate the dirt from the media. Chamber part B serves as a stilling basin as inside chamber part B there is no turbulent action. Chamber part B is used for the transfer of dirty water only. Only the dirty water passes through the opening between baffles 13 and 15. The filter media may enter the "entrance" between baffles 13 and 15 but will fall back into chamber part A due to gravity. The filter media never reaches the outlets 18, only contaminated water exits.

There have been described and illustrated herein methods and apparatus for removing particulate contaminants from commercial laundry waste water. While particular embodiments of the invention have been described, it is not intended that the invention be limited thereto, as it is intended that the invention be as broad in scope as the art will allow and that the specification be read likewise. For example, although it is preferred to use a layer of stones to support the filter media and prevent it from being flushed or lost down outlets 20, other relatively large discrete particulate materials, natural or synthetic, may be suitable for this purpose. In addition, although it is preferable to employ a blower-powered air manifold to effect backwashing of the filter media, certain benefits of the invention may be achieved with other means for creating a turbulent mixture of air and water, such as a motor-operated paddle or mixer for mixing the filter media. It will therefore be appreciated by those skilled in the art that yet other modifications could be made to the provided invention without deviating from its spirit and scope as so claimed.

What is claimed is:

1. A water filtration apparatus, comprising:
   a) a tank having an upper inlet and a lower outlet;
   b) a lower perforated baffle located in said tank between said inlet and said outlet;
   c) means for supporting filter media disposed in said tank above said lower baffle;
   d) a layer of filter media disposed in said tank on top of said means for supporting;
   e) an air manifold located in said tank between said filter media and said lower baffle for directing air toward and through said filter media;
   f) an upper chamber defined between said filter media and said upper inlet;
   g) said tank having a backwash inlet located below said lower baffle;
   h) said tank having a backwash outlet in fluid communication with said upper chamber; and
   i) a dividing baffle disposed in said tank separating at least a portion of said upper chamber into a first part and a second part, said upper inlet being adjacent to and in direct fluid communication with said first part and said backwash outlet being adjacent to and in direct fluid communication with said second part, and said first and second parts being in fluid communication with one another.

2. A water filtration apparatus according to claim 1, further comprising:
   i) an air pump coupled to said air manifold.

3. A water filtration apparatus according to claim 1, further comprising:
   j) an angled baffle located in said tank between said dividing baffle and said filter media.

4. A water filtration apparatus according to claim 1, further comprising:
   j) an air pump coupled to said air manifold.

5. A water filtration apparatus according to claim 1, wherein said filter media is selected from the group consisting of granular carbon, sand, zeolite and a combination thereof.

6. A water filtration apparatus according to claim 1, wherein said means for supporting comprises a layer of stones.

7. A water filtration apparatus according to claim 6, wherein said stones generally range in size from about ½" to about ¾".

8. A water filtration apparatus, comprising:
   a) a tank having an inlet and an outlet;
   b) a first baffle located in said tank between said inlet and said outlet;
   c) a layer of filter media located in front of said first baffle;
   d) a backwash inlet located behind said layer of filter media;
   e) a backwash outlet located in said tank in front of said baffle;
   f) a second baffle disposed in said tank separating at least a portion said upper chamber into a first part for the turbulent mixing of air, water, and filter media and for separating contaminants from said filter media, and a second part which serves as a stilling basin for the collection and removal of water containing said contaminants, said upper inlet being in direct fluid communication with said first part and said backwash outlet being in direct fluid communication with said second part and said first and second parts being in fluid communication with one another; and
   g) an angled baffle located between said second baffle and said filter media for returning filter media via gravity from said stilling basin to said layer of filter media located in front of said first baffle.

* * * * *